Patented Oct. 15, 1935

2,017,828

UNITED STATES PATENT OFFICE 2,017,828

PROCESS FOR PRODUCING DISODIUM PHOSPHATE

Charles F. Booth, Anniston, Ala., assignor to Swann Research, Incorporated, a corporation of Alabama No Drawing. Application May 26, 1932, Serial No. 613,769

1 Claim. (Cl. 23—107)

This invention relates to a new composition of matter comprising principally an alkali metal phosphate with turbidity inhibiting properties.

One object of this invention is the provision of a new composition of matter comprising essentially an alkali metal orthophosphate having the property of dissolving in water without the formation of a turbid solution.

A further object of this invention is the provision of a new composition of matter comprising essentially a disodium orthophosphate having the property of dissolving in water which contains either iron or aluminum compounds or both without the formation of a turbid solution. A still further object is the provision of a process for producing such compositions.

This application is a continuation in part of my copending application, Serial No. 590,318 filed Feb. 1, 1932, now Patent No. 1,901,020.

One important simple test for the purity of alkali phosphates, especially dibasic alkali phosphates such as disodium and dipotassium orthophosphates consists in making a solution of the phosphate in cold water and then observing the turbidity of the same. During this test, impurities such as iron and particularly aluminum phosphate precipitate out as a suspension, causing turbidity.

When a dibasic alkali metal orthophosphate is thus tested for turbidity, distilled water is usually used for making the solution on which the turbidity test is made. In many chemical operations in which such dibasic alkali metal phosphate is used, it is customary to employ ordinary tap water which may contain appreciable quantities of iron and aluminum salts. When such water is employed an undesirable turbidity is formed, due to the formation of phosphates of these metals.

I have now found that if sufficient tetra-basic-pyro-phosphate is added to the dibasic alkali metal orthophosphate either before or during the crystallization of the latter from solution so that a small percentage of the pyro-phosphate is contained in the crystalline orthophosphate, a material will be obtained which will show no turbidity on the ordinary test and furthermore can be dissolved in water containing appreciable quantities of the above mentioned impurities without causing precipitation of these impurities.

My new composition, when subjected to the above test, is considered to come within the object set forth when the solution made therefrom in pure water or in water containing appreciable quantities of iron and aluminum shows little or no turbidity.

While conducting experiments on various methods of manufacturing dibasic alkali metal phosphate, I discovered that the addition of small amounts of tetrabasic alkali metal pyrophosphate to the dibasic phosphate solution before crystallization, caused iron and aluminum compounds present and dissolved in the solution to remain almost wholly in the mother liquor, whereas in the absence of the tetrabasic pyrophosphate, a large amount of the above mentioned impurities were precipitated and occluded by the crystals.

In order that others may understand my invention, I will describe several ways by which my invention may be practiced, although I do not wish to be limited thereby except as indicated in the appended claim.

Prepare an aqueous solution of disodium phosphate by the neutralization of commercial soda ash with phosphoric acid, said acid containing in the neighborhood of 0.5% combined iron and aluminum phosphates. While various strengths of phosphoric acid may be used, I prefer to use an acid of such strength that the solution produced will have a gravity of 1.25 to 1.26 at 60° C. Such a solution when produced by the neutralization of acid with soda ash will contain some carbon dioxide, which should be eliminated by boiling. When substantially all of the carbon dioxide has been expelled and the solution cooled and adjusted to the proper gravity at a temperature of 60° C., it is filtered so that it is perfectly clear. Now add to this solution sufficient tetrasodium pyrophosphate to give from 0.05% to 0.25% $Na_4P_2O_7$ by weight in the filtered solution. Usually between 0.1% and 0.14% by weight will be sufficient.

Either crystalline or anhydrous tetrasodium pyrophosphate may be used. The solution is now allowed to crystallize by cooling either in a Swenson-Walker crystallizer or in an ordinary vat depending on the size and uniformity of the crystals desired.

After crystallization the crystals are carefully separated from the mother liquor by means of a centrifuge, after which they are dried. Thus prepared the crystals will be found to show little or no turbidity when subjected to the aforementioned test.

My examination of disodium phosphate crystals produced in the above manner has convinced me that a small amount of the tetrapyrophosphate is present in the disodium phosphate crystals thus obtained, even though as little as 0.25% of the tetrapyrophosphate has been added to the solution before crystallization. Such small amount is of course difficult to detect chemically, much less determine quantitatively.

I have now found that the amount of tetrapyrophosphate present in the dibasic orthophosphate may be increased to a greater degree by simply increasing the amount added to the solution. By adding several percent by weight, calculated on the total weight of solution, it is possible to obtain a dibasic alkali orthophosphate containing as much as 2% by weight of the tetrapyrophosphate.

If, for example a disodium orthophosphate be prepared in the above manner containing say up to 2% by weight of tetrasodium pyrophosphate such a composition will have valuable properties in many chemical operations in which solutions of phosphates are made, and will enable such operations to be carried out using water containing small quantities of iron or aluminum compounds without the formation of undesirable amounts of suspended insoluble phosphates. Another valuable use will be found in the ability to use iron tanks or other apparatus for chemical operations involving these salts where the small amount of iron entering the solution would ordinarily produce an undesirable suspension in the solution.

While ordinarily a disodium phosphate containing as much as 2% by weight of sodium pyrophosphate will be suitable for most purposes, in general the proportion of the latter salt may be somewhat less than this figure. For most chemical operations I prefer to utilize less than this percentage and have found up to ¾% to 1% by weight to be most generally suitable.

While for many purposes the tetrabasic alkali metal pyrophosphate may be added to the solution of dibasic alkali metal orthophosphate and thus assist in the production in a pure orthophosphate, I also contemplate the direct mixing of the dry salts as a specific embodiment of my invention. The desired proportions may be as above set out, i. e., for many purposes I prefer at the most 2% by weight of the pyrophosphate but generally I recommend between 1 and ¾ of 1 percent by weight.

The above described process may be applied in like manner to the production of other dibasic alkali metal orthophosphates, such as dipotassium phosphate and of course may be applied to the production of dibasic alkali metal orthophosphate with turbidity inhibiting properties by whatever means produced. I have described in detail the production of the disodium phosphate by the neutralization of soda ash with phosphoric acid, it will be apparent, however, that dibasic alkali metal phosphate solutions may be prepared by other means than that described.

The proportions above set out are useful for most purposes in which the iron and aluminum content of the water used is that usually found in industrial water supplies. The pyrophosphate content of the orthophosphate can, of course, be varied to suit the requirements of each water by increasing the content of the former, if the iron and aluminum content is so large as to cause precipitation and turbidity. A simple experiment will determine this point. For waters extraordinarily high in iron or aluminum or both it might be necessary to increase the pyrophosphate content above that herein given as the maximum.

While I have described several embodiments only of my invention, it will be apparent to those skilled in the art that it is not so limited, but that it is susceptible of various changes and modifications without departing from the spirit thereof, and I desire that only such limitations shall be placed thereupon as may be imposed by the prior art, or as are specifically set forth in the appended claim.

I claim:

Process of producing crystalline disodium orthophosphate having the property of inhibiting turbidity when dissoved in water having a high content of iron and aluminum from solution comprising adding to said solution between 0.25% and 2.0% by weight of tetrasodium pyrophosphate and crystallizing both phosphates together from said solution.

CHARLES F. BOOTH.